(12) United States Patent  (10) Patent No.: US 8,711,594 B2
Zhang et al.  (45) Date of Patent: Apr. 29, 2014

(54) ASYMMETRIC SWITCHING RECTIFIER (75) Inventors: Minxian Max Zhang, Mountain View, CA (US); Jianhua Yang, Palo Alto, CA (US); R. Stanley Williams, Portola Valley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 463 days.

(21) Appl. No.: 13/212,428

(22) Filed: Aug. 18, 2011

(65) Prior Publication Data

US 2013/0044525 A1   Feb. 21, 2013

(51) Int. Cl.
 *H02M 7/06* (2006.01)
(52) U.S. Cl.
 USPC .......................................................... 363/126
(58) Field of Classification Search
 CPC ....................................................... H02M 7/06
 USPC ................................................... 363/125, 126
 See application file for complete search history.

(56) References Cited

U.S. PATENT DOCUMENTS

| | | | | |
|---|---|---|---|---|
| 3,309,601 | A | * | 3/1967 | Dudley .......................... 363/126 |
| 2011/0002148 | A1 | * | 1/2011 | Iturriz et al. ................... 363/126 |
| 2012/0307537 | A1 | * | 12/2012 | Ramorini et al. .............. 363/126 |
| 2013/0044525 | A1 | * | 2/2013 | Zhang et al. ..................... 363/84 |
| 2013/0070500 | A1 | * | 3/2013 | Usami ............................ 363/126 |
| 2013/0250638 | A1 | * | 9/2013 | Tuttle et al. .................... 363/126 |

* cited by examiner

*Primary Examiner* — Jeffrey Sterrett (57) ABSTRACT

An asymmetric switching rectifier includes a first switching device to allow electric current to flow while in a first state and inhibit electric current in a second state and a second switching device connected in a head-to-head formation to said first switching device, said second switching to allow electric current to flow while in a first state and inhibit electric current in a second state. A first electric current to turn said switching devices to said first state is different than a second electric current to turn said switching devices to said second state. The rectifier further includes a bypass segment to draw a bypass electric current from a center electrode between said first switching device and said second switching device.

15 Claims, 6 Drawing Sheets

Apply a switching current to a first switching device connected in series to a second switching device in a head-to-head manner such that the switching current switches the first switching device to a first state and the second device to a second state
(block 602)

Draw a bypass current from a center electrode between the first switching device and the second switching device, the bypass current causing a different amount of electric current to be applied to the switching devices
(block 604)

*Fig. 6*

ASYMMETRIC SWITCHING RECTIFIER

BACKGROUND

A rectifier is an electronic component or system that is designed to convert an alternating current into a direct current. This is done by allowing current flowing in one direction to pass while blocking or reversing current flowing in an opposite direction. One way to form a rectifier is to place two diodes in a head-to-head configuration. A diode is a device that allows electric current to flow in one direction and blocks electric current flowing in the opposite direction. When placed in a head-to-head configuration, the diodes allow electric current to flow to a center electrode between the two diodes but inhibit electric current flowing away from the center electrode.

One type of device that may be used as a diode in a head-to-head rectifier is a resistive element such as a memristor. A memristor is a device that changes resistance in response to certain electrical conditions. For example, application of an electric current in one direction may set the memristor to an ON state wherein electric current is allowed to flow in that direction. An electric current applied in the opposite direction will set the resistor to an OFF state. The amount of current used to change the state of the memristor may not be symmetrical. For example, it may take twice as much electric current to turn the memristor to an OFF state than it takes to turn the memristor to an ON state. Therefore, a single electric current applied across both memristor devices will not effectively reversibly change the states of those memristor devices.

BRIEF DESCRIPTION OF THE DRAWINGS

The accompanying drawings illustrate various examples of the principles described herein and are a part of the specification. The drawings are merely examples and do not limit the scope of the claims.

Throughout the drawings, identical reference numbers designate similar, but not necessarily identical, elements.

DETAILED DESCRIPTION

As mentioned above, the amount of current used to change the state of the memristor may not be symmetrical. For example, it may take twice as much electric current to turn the memristor to an OFF state than it takes to turn the memristor to an ON state. Therefore, a single electric current applied across both memristor devices will not effectively change the states of those memristor devices.

In light of this and other issues, the present specification discloses an asymmetric switching rectifier that is capable of handling discrepancies between switch ON and switch OFF currents. According to certain illustrative examples, the rectifier includes two switching devices such as memristors in a head-to-head configuration. A bypass segment is connected to a center electrode between the two switching devices. This bypass segment draws an electric current to account for the difference between the switch ON and switch OFF current characteristics of the switching devices.

Through use of methods and systems embodying principles described herein, an asymmetrical switching rectifier may be realized. Thus, memristive devices used as diodes may be used which have different switch ON and switch OFF currents. The state of the rectifier will be able to change in response to an applied alternating current without damaging the rectifier or causing problems with other circuitry connected to the rectifier.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Figure 1:
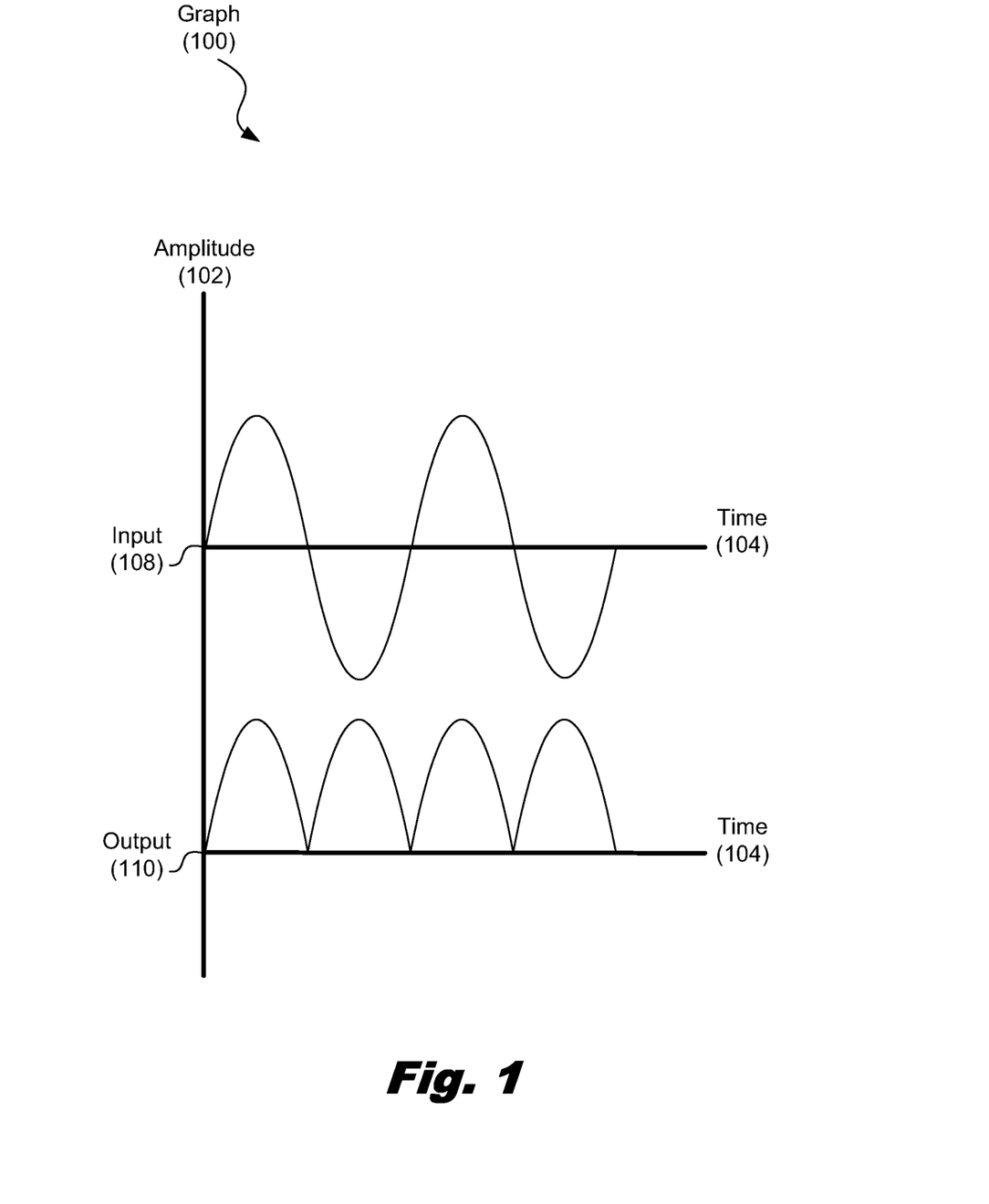
FIG. 1 is a diagram showing a graph that illustrates the function of a rectifier, according to one example of principles described herein.

Referring now to the figures, FIG. 1 is a diagram showing a graph (100) that illustrates the function of a rectifier. The vertical axis represents the amplitude (102) of an electrical signal. The horizontal axes represent time (104). The graph illustrates an input signal (108) as a function of time in comparison to an output signal (110) of a rectifier as a function of time. In this case, the portions of the signal that are negative on the input signal (108) are reversed and are thus positive on the output signal (110). When using such a rectifier to convert alternating current to direct current, various other electrical components such as capacitors may be used to smooth out the output signal into a steady signal. As mentioned above, one way to form such a rectifier is through use of memristive devices.

Figure 2A:
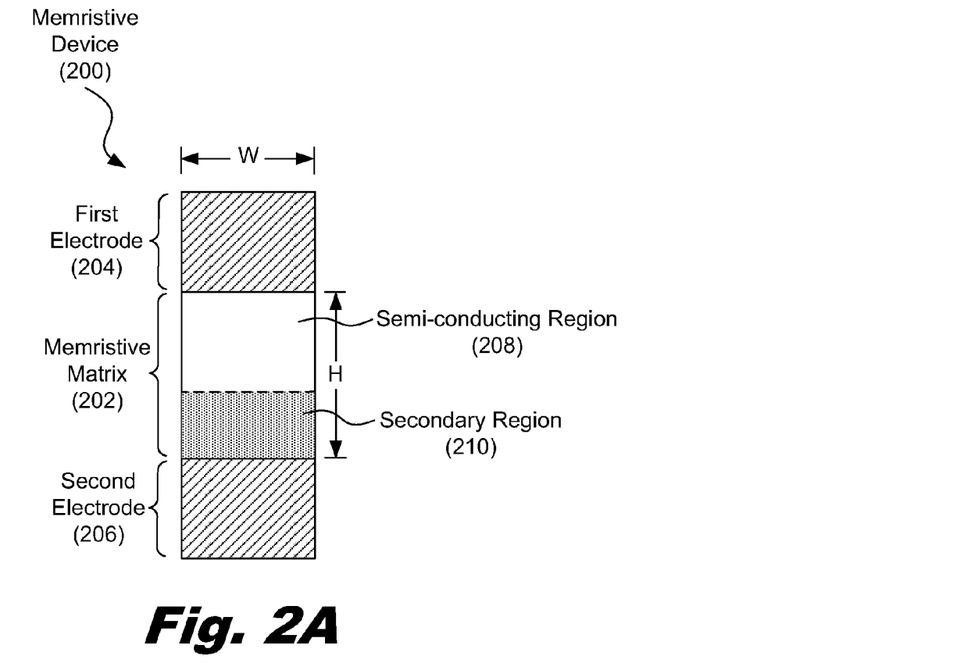
FIGS. 2A and 2B are diagrams showing an illustrative memristive device in different states, according to one example of principles described herein.

FIG. 2A is diagram showing an illustrative memristive device with no electrical conditions being applied. According to one illustrative example, the memristive device includes a first electrode (204) and a second electrode (206) in electrical and physical contact with a memristive matrix (202). The memristive matrix (202) is initially comprised of two separate regions: a semiconducting region (208) which is not intentionally doped and a highly doped secondary region (210).

Throughout the specification and appended claims, the term "memristive matrix" describes a thin film of material that is electronically semiconducting or nominally electronically insulating and also a weak ionic conductor. The memristive matrix (202) is capable of transporting and hosting ions that act as dopants to control the flow of electrons through the memristive device (200). The basic mode of operation is to apply an electric field (the drift field, which may exceed a threshold for enabling the motion of the ions in the memristive matrix) across the memristive device (200). The electric field is large enough to cause an ionic species to be transported within the memristive matrix (202) via ionic transport. The ionic species are specifically chosen from those that act as electrical dopants for the memristive matrix (202), and thereby change the electrical conductivity of the matrix from a high resistive state to a low resistive state. Furthermore, the memristive matrix (202) and the dopant species are chosen such that the drift of the dopants within the memristive matrix (202) is possible but not too facile. This ensures that the memristive device remains in whatever state it is set for a reasonably long time, perhaps many years at room temperature. Thus, the memristive device (200) is nonvolatile. A nonvolatile device is one which holds its state with or without receiving power.

The memristive matrix material (202) may be a thin film (generally less than 200 nm thick), and is in many cases nanocrystalline or amorphous. The mobility of the dopant species in such nanostructured materials is much higher than in a bulk crystalline material, since diffusion can occur through grain boundaries, pores, or through local structural imperfections in an amorphous material. Also, because the film is so thin, the amount of time required to drift enough dopants into or out of a local region of the film to substantially change its conductivity is relatively rapid. Another advantage of nanometer scale memristive devices is that a large electric field can be produced by a relatively small applied voltage.

Conduction of electrons through the matrix material (202) is frequently dominated by quantum mechanical tunneling of the electrons. When a semiconducting matrix material is essentially intrinsic at a junction with an electrode, the tunneling barrier is high and wide, causing the memristive device to be in a high resistive state. When a significant number of dopant species have been injected into or distributed throughout the semiconductor, the width and perhaps the height of the tunneling barrier are diminished by the potential of the charged species. This results in an increase of the conductivity of the switch, placing the memristive device (200) in a low resistive state.

FIG. 2A illustrates one potential "as manufactured" state of the memristive device (200). The semiconducting region (208) has very few dopants and prevents electrical current from flowing between the two electrodes (204, 206). The secondary region (210) is conductive and serves as a source of dopants which can be moved into the semiconducting region (208) to change the overall electrical conductivity of the memristive matrix (202). Consequently, in the "as manufactured" state of the memristive device illustrated in FIG. 2A, the memristive device (200) is a high resistive state.

The electrodes (204, 206) may be constructed from a variety of conducting materials, including but not limited to: metals, metal alloys, metal composite materials, nanostructured metal materials, or other suitable conducting materials.

The memristive matrix (202) has a height of "H" and a width of "W" as shown in FIG. 2A. For purposes of illustration only, assume that the height "H" is 100 nanometers and the width "W" is approximately 50 nanometers. As discussed above, a relatively intense electric field can be generated across the thin film of memristive matrix by a relatively small voltage. For example, a dopant may require an electric field intensity of 100,000 volts per centimeter to move within the matrix. If the distance between two electrodes is 100 nanometers, a voltage bias of only 1 Volt applied across the first electrode (204) and the second electrode (206) will produce the required electric field intensity of 100,000 volts/centimeter through the memristive material (202). The application of a programming voltage above a certain threshold allows the dopants to be moved through the memristive matrix (202).

Figure 2B:
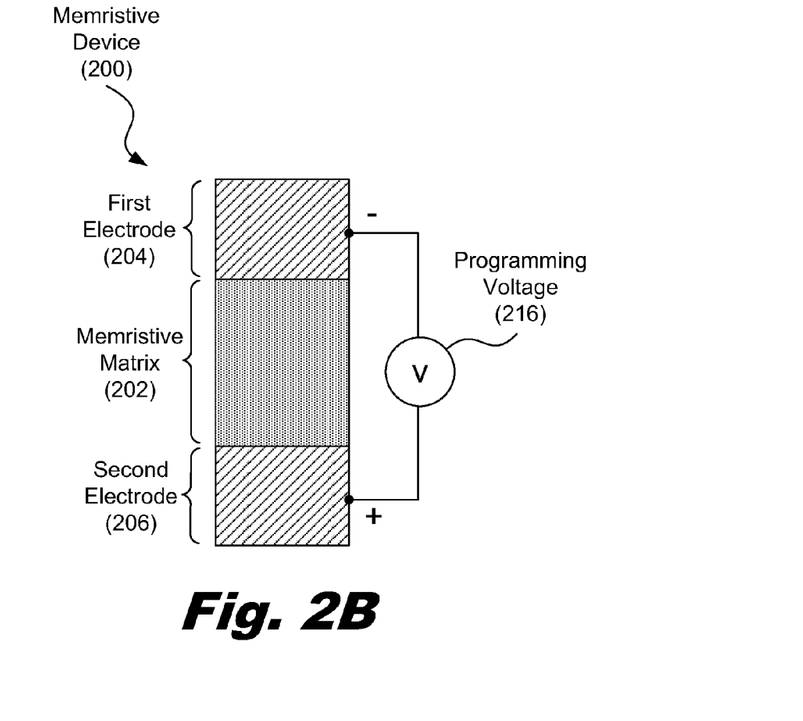

FIG. 2B is a diagram showing the memristive device (200) with a programming voltage (216) applied. The programming voltage (216) results in an electric field which facilitates not only the movement of dopants from the highly doped region (210) into the intrinsic region (208) but also the creation of some native dopants, such as oxygen vacancies, via an electro-reduction process in oxide memristive materials. The polarity and voltage difference which is applied across the memristive matrix (202) varies according to a variety of factors including, but not limited to: material properties, geometry, dopant species, temperature, and other factors. For example, when the ions are positively charged, the ions are repelled by positive voltage potentials and attracted to negative voltage potentials. For example, a positive voltage may be applied to the second electrode (206) and negative voltage may be applied to the first electrode (204).

According to one illustrative example, the initial application of a programming voltage (216) to the memristive device (200) is used to form the junction and define its characteristics. This initial programming voltage (216) may be higher than other applied voltages used for operational purposes. The initial programming voltage (216) may serve a number of functions which prepare the junction for further use. For example, the programming voltage (216) may result in the initial creation of additional mobile dopants or the migration of the mobile dopants into more active regions of the memristive matrix (202), which reduces the effective thickness of the switching layer and causes an increased electric field with the same applied voltage. In addition, the electric field for dopant drift in the switching process is usually lower than that for dopant creation in the electroforming process. Consequently, lower programming voltages (216) can be subsequently used to move the dopants.

Figure 3:
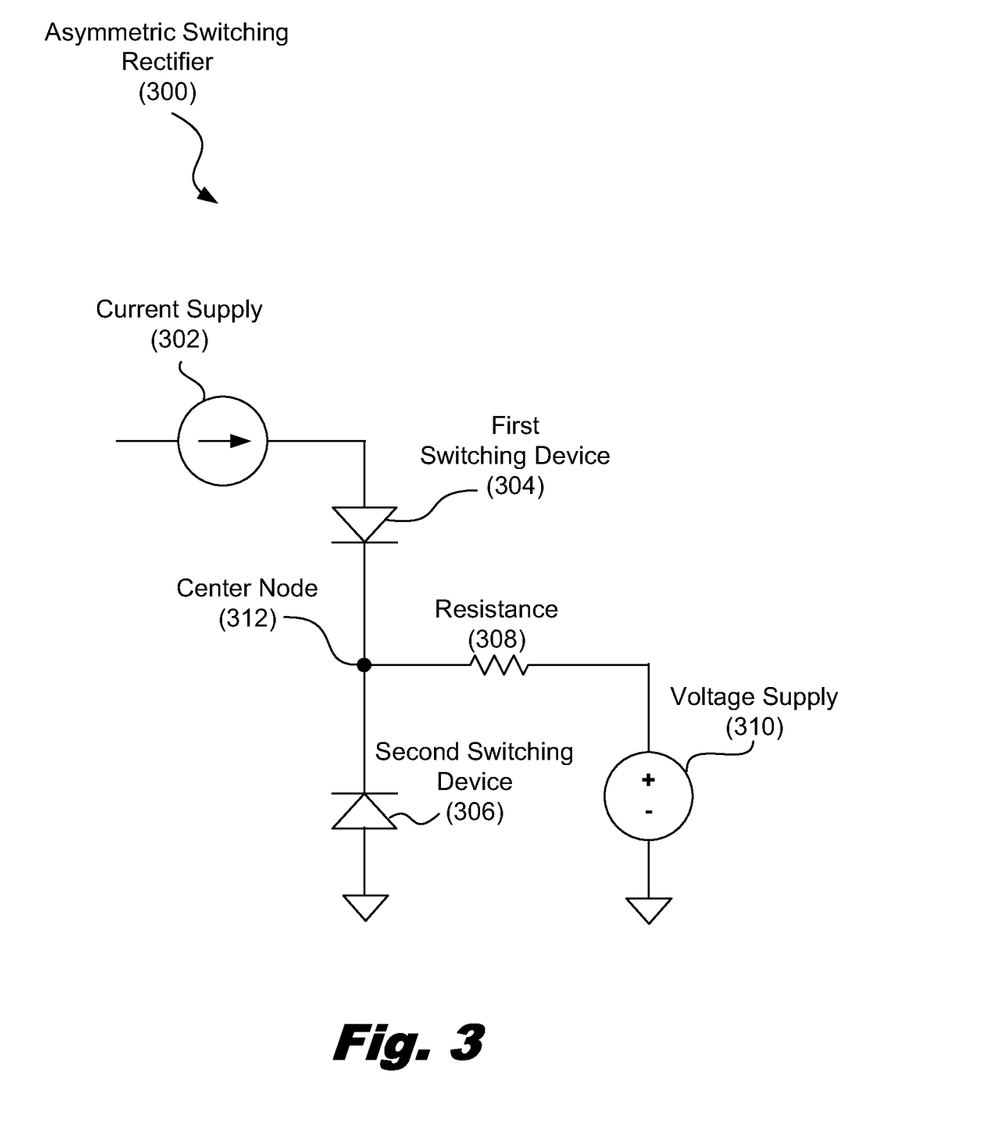
FIG. 3 is a diagram showing an illustrative circuit schematic of an asymmetric switching rectifier, according to one example of principles described herein.

FIG. 3 is a diagram showing an illustrative circuit schematic of an asymmetric switching rectifier. According to certain illustrative examples, a first switching device (304) is connected in a head-to-head manner to a second switching device (306). The switching devices (304, 306) are shown as diode symbols within the schematic because the switching devices (304, 306) are essentially acting as diodes.

By being placed in a head-to-head manner, the switching devices (304, 306) are such that electric current is generally allowed to flow towards the center node but is inhibited from flowing away from the (312) center node. In the case that the switching devices are memristive devices, then one switching device will be in an ON state while the other is in an OFF state and vice versa. A current supply (302) is used to apply a switching current to both of the switching devices. Although a current supply is illustrated to supply an electrical signal in the form of electrical current to the rectifier, a voltage supply may be used as well to provide an electrical signal in the form of a voltage.

As mentioned above, many memristive devices are set to an ON state using a different amount of electric current than is used to set those memristive devices to an OFF state. However, the amount of electric current flowing into one node is the same amount of electric current that flows out of that node. Thus, an electric current applied to the first switching device will be the same amount of electric current applied to the second switching device.

In order to allow different amounts of switching currents to be applied to the switching devices (304, 306), a bypass segment is connected to the center node (312). This bypass segment will draw a bypass electric current from the switching current. This bypass current can be created by connecting a resistance line (308) between the center node (312) and a voltage supply (310). The voltage level and resistance level of the bypass segment can be set to cause a specific amount of bypass current to be drawn from the switching current. The bypass current will thus account for the difference between the switch ON current and the switch OFF current of the memristive devices.

Figure 4A:
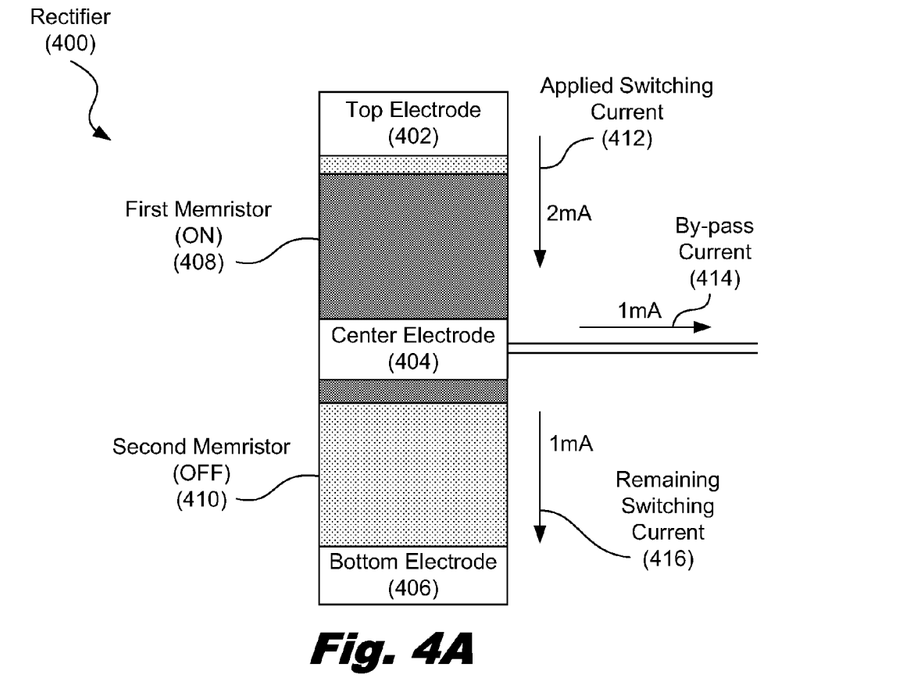
FIGS. 4A and 4B are diagrams illustrating the states of an asymmetric switching rectifier, according to one example of principles described herein.
Figure 4B:
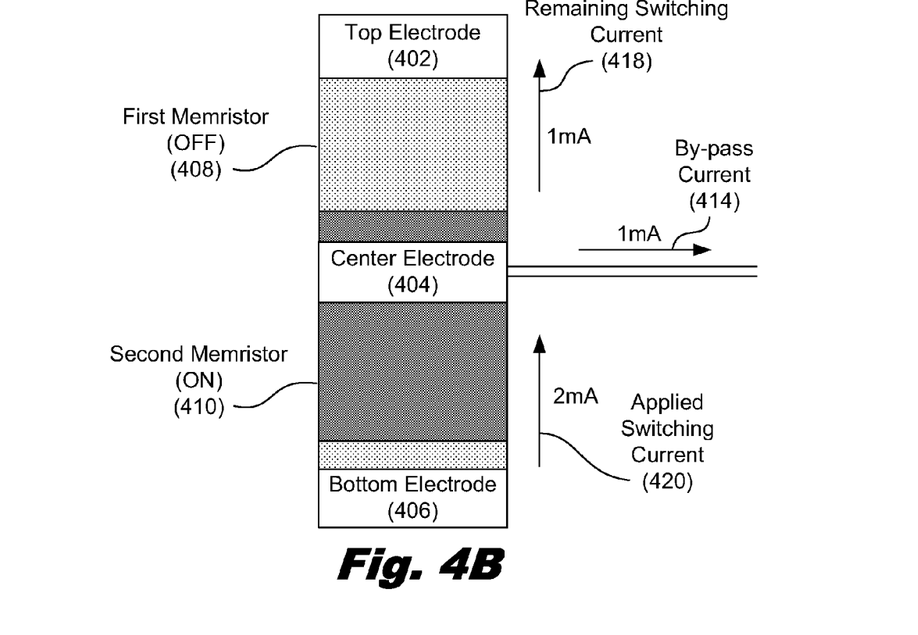

FIGS. 4A and 4B are diagrams illustrating the states of an asymmetric switching rectifier (400). The rectifier (400)

includes a first memristor (408) between a top electrode (402) and a center electrode (404). The rectifier (400) further includes a second memristor (410) between the center electrode (404) and a bottom electrode (406).

In one example, the memristive matrix material of the memristors (408, 410) may be made of Tantalum Oxide (TaO$_x$, where x is the atomic ratio of oxygen to metal in an oxide material). The top electrode (402) and the bottom electrode (406) may be made of a conductive material such as platinum (Pt). The top electrode (402) and bottom electrodes will thus form a schottky contact with the adjacent memristive matrix material. The center electrode (404) may be made of a material such as tantalum. This tantalum material will form an ohmic contact to the adjacent TaO memristive matrix material. Although an example describes the use of tantalum oxide for a memristive device, various other memristive materials such as metal oxides, nitrides, and sulfides may be used to form a memristive device.

FIG. 4A illustrates a first state of the rectifier (400). In this first state, the first memristor (408) is in an ON state. Thus, the mobile dopants exist throughout the memristive matrix and electric current is allowed to flow through the memristor (408) from the center electrode (404) to the top electrode (402). The second memristor (410) is in an OFF state. Thus, the mobile dopants have been moved towards the middle electrode and thus current is inhibited from flowing from the bottom electrode (404) towards the center electrode (404).

In order to change the state of the rectifier (400), the first memristor (408) has to be switched to an OFF state and the second memristor (410) has to be switched to an ON state. This change will occur when a positive electric current (flowing from the top electrode to the bottom electrode) is applied. However, a different amount of current has to be applied to change the respective states of those memristors (408, 410). In this example, a current of 2 milliamps (mA) is used to switch the first memristor (408) to an OFF state. However, a current of only 1 mA should be used to change the state of the second memristor (410) to an ON state.

In order to handle this difference between switching currents, the bypass (414) current can be set to a value of 1 mA. This is the difference between the switch ON current and the switch OFF current of the memristors (408, 410). Thus, with an applied switching current (412) of 2 mA, 1 mA will be removed by the bypass current (414) and the remaining switching current (416) of 1 mA will be applied to the second memristor (410). The amount of electric current flowing into the center electrode is equal to the amount of current flowing out of the center electrode (404) (switch off current)=(switch on current)+(bypass current). In this example, the switch off current of 2 mA is equal to the switch on current of 1 mA plus the bypass current of 1 mA.

FIG. 4B illustrates a second state of the rectifier (400). In this second state, the first memristor (408) is in an OFF state. Thus, the mobile dopants have been moved towards the center electrode (404) and current is prevented from flowing from the top electrode (402) to the center electrode (404). The second memristor (410) is now in an ON state. Thus, the mobile dopants exist throughout the memristive matrix and current is allowed to flow through the memristor (408) from the center electrode (404) to the bottom electrode (406).

In order to set the rectifier (400) back to the first state, 2 mA of current is used to switch the second memristor (410) to an OFF state and 1 mA of current is used to switch the first memristor (408) to an ON state. This is done by applying a negative current (flowing from the bottom electrode to the top electrode). Again, with an applied switching current (420) of 2 mA, 1 mA will be drawn out by the bypass current (414) causing a remaining switching current (418) of 1 mA to be applied to the first memristor (408).

When applying an alternating current to the rectifier, the state of the rectifier will continue to switch back and forth. Because both memristors are switched on and off using an appropriate current level, this continual switching is able to occur more smoothly without causing excessive wear or damage to the memristive devices.

Figure 5:
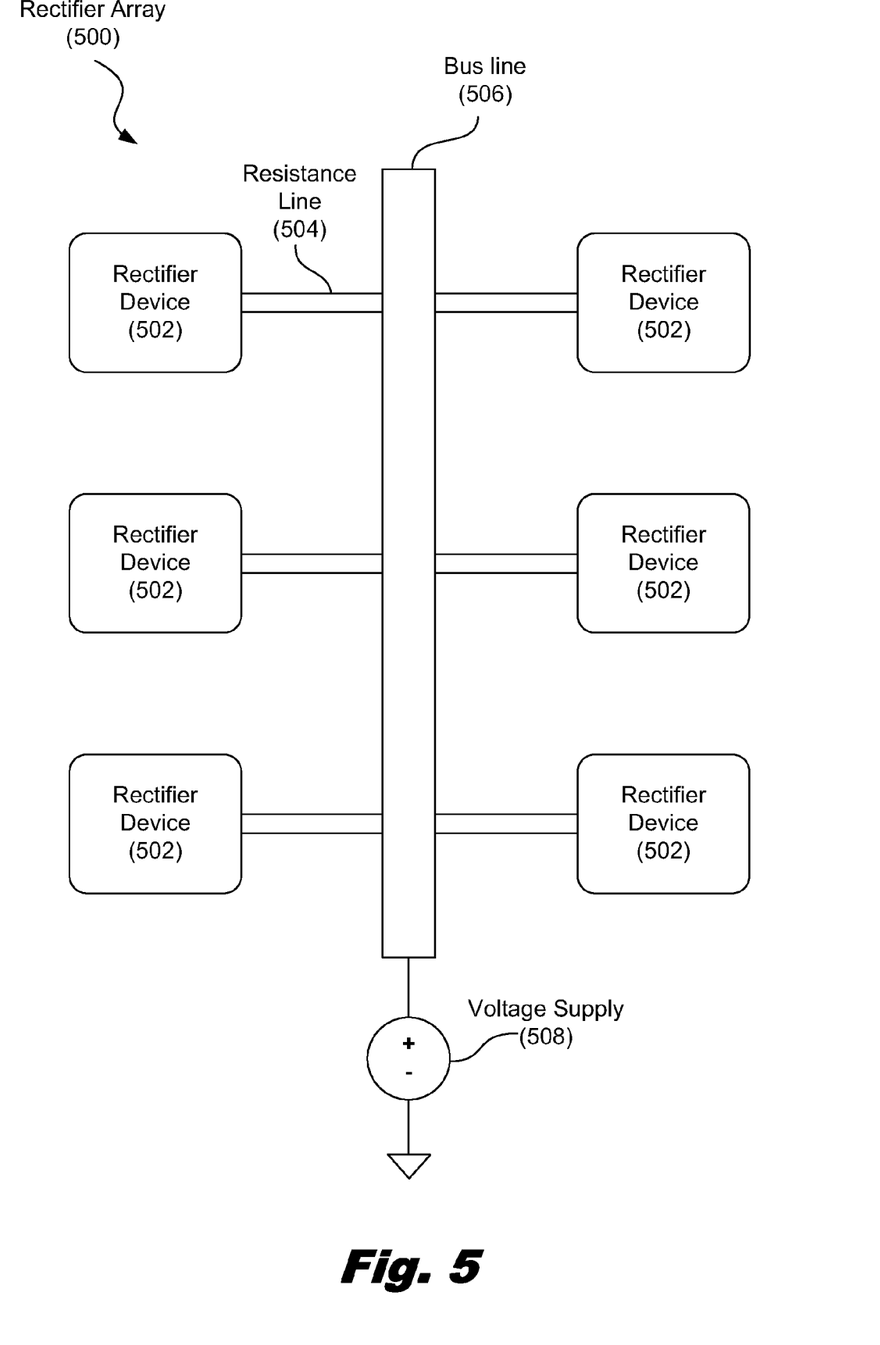
FIG. 5 is a diagram showing an illustrative top view of an array of rectifiers, according to one example of principles described herein.

FIG. 5 is a diagram showing an illustrative top view of rectifier array (500). According to certain illustrative examples, an array of asymmetric switching rectifier devices (502) may be formed. The bypass current for each of these rectifier devices may be created by a voltage supply (508) applied to a bus line (506). A resistance line (504) may be connected between each rectifier device (502) and the bus line. The voltage level of the voltage supply (508) and the resistance values for each of the resistance lines (504) may be set so that the proper amount of electric current is drawn from each rectifier device. In some cases, not every rectifier device (502) will use the same level of bypass current. Therefore, the resistance lines (504) may vary in resistance value so that each rectifier device (502) has the proper level of bypass current being drawn from the center electrode of that rectifier device (502).

Figure 6:
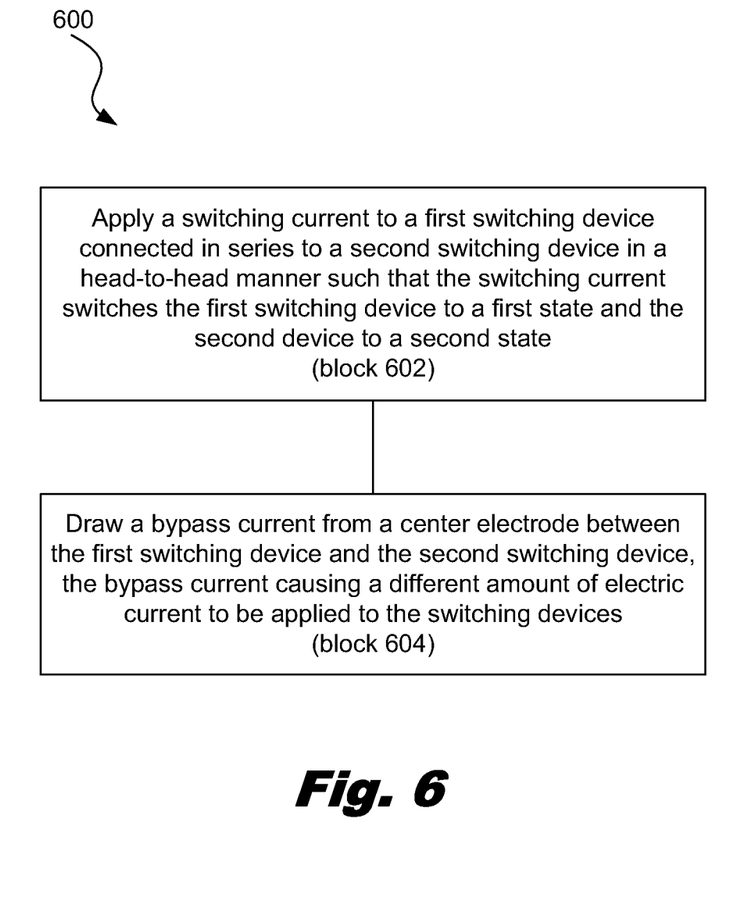
FIG. 6 is a flowchart showing an illustrative method for asymmetric switching rectification, according to one example of principles described herein.

FIG. 6 is a flowchart showing an illustrative method (600) for asymmetric switching rectification. According to certain illustrative examples, the method includes applying (block 602) a switching current to a first switching device connected in series to a second switching device in a head-to-head manner such that the switching current switches the first switching device to a first state and the second device to a second state, and drawing (block 604) a bypass current from a center electrode between the first switching device and the second switching device, the bypass current causing a different amount of electric current to be applied to the switching devices.

In conclusion, through use of methods and systems embodying principles described herein, an asymmetrical switching rectifier may be realized. Thus, memristive devices used as diodes may be used which have different switch ON and switch OFF currents. The state of the rectifier will be able to change in response to an applied alternating current without damaging the rectifier or causing problems with other circuitry connected to the rectifier.

The preceding description has been presented only to illustrate and describe examples of the principles described. This description is not intended to be exhaustive or to limit these principles to any precise form disclosed. Many modifications and variations are possible in light of the above teaching.

What is claimed is:

1. An asymmetric switching rectifier comprising:
   a first switching device to allow electric current to flow while in a first state and inhibit electric current in a second state;
   a second switching device connected in a head-to-head formation to said first switching device, said second switching to allow electric current to flow while in a first state and inhibit electric current in a second state, wherein a first electric current to turn said switching devices to said first state is different than a second electric current to turn said switching devices to said second state; and
   a bypass segment to draw a bypass electric current from a center electrode between said first switching device and said second switching device.

2. The rectifier of claim 1, wherein said bypass current is equal to a difference between said first electric current and said second electric current.

3. The rectifier of claim 1, wherein said bypass segment comprises a resistance and an electrical condition supply, said electrical condition supply being one of: a voltage supply and a current supply.

4. The rectifier of claim 3, wherein said electrical condition supply is applied to a bus line, said bus line having multiple resistance lines connected to draw multiple bypass currents from multiple rectifiers.

5. The rectifier of claim 1, wherein said switching devices comprise memristive devices.

6. The rectifier of claim 5, wherein said memristive devices comprise Tantalum Oxide (TaO) and said center electrode comprises Tantalum (Ta).

7. The rectifier of claim 5, wherein said center electrode between said switching devices makes an ohmic contact with a memristive material of said switching devices and outer electrodes of said switching devices make a Schottky contact with said memristive material.

8. A method for switching an asymmetric switching rectifier, the method comprising:
applying a switching current to a first switching device connected in series to a second switching device in a head-to-head manner such that said switching current switches said first switching device to a first state and said second device to a second state;
drawing a bypass current from a center electrode between said first switching device and said second switching device, said bypass current causing a different amount of electric current to be applied to said switching devices.

9. The method of claim 8, wherein said bypass current is equal to a difference between an amount of current used to switch said switching devices to said first state and an amount of current used to switch said switching device to said second state.

10. The method of claim 8, wherein said bypass current is formed by an electrical condition supply and a resistance line between said electrical condition supply and said center electrode, said electrical condition supply comprising one of: a voltage supply and a current supply.

11. The method of claim 10, wherein said electrical condition supply is applied to a bus line, said bus line having multiple resistance lines connected to draw multiple bypass currents from multiple asymmetric switching rectifiers.

12. The method of claim 8, wherein said switching devices comprise memristive devices.

13. The method of claim 12, wherein said memristive devices comprise Tantalum Oxide (TaO) and said center electrode comprises Tantalum (Ta).

14. The method of claim 12, wherein said center electrode between said switching devices makes an ohmic contact with a memristive material of said switching devices and outer electrodes of said switching devices make a Schottky contact with said memristive material.

15. An asymmetric switching rectifier comprising:
a first memristive device connected in a head-to-head manner to a second memristive device; and
a bypass segment connected to a center electrode between said first memristive device and said second memristive device to draw a bypass current from said center electrode;
wherein said bypass current is equal to a difference between an amount of current used to switch said memristive devices to an ON state and an amount of current used to switch said memristive devices to an OFF state.

* * * * *